April 7, 1931.  S. H. FRANKLIN  1,799,978
CYLINDER TURNING DEVICE FOR USE PARTICULARLY
IN CONTINUOUS STEAMING MACHINES
Filed Nov. 21, 1929   3 Sheets-Sheet 3

Inventor
Stanley H. Franklin
By Thomas A. Jenckes Jr.
Attorney

UNITED STATES PATENT OFFICE

STANLEY H. FRANKLIN, OF PROVIDENCE, RHODE ISLAND, ASSIGNOR, BY MESNE ASSIGNMENTS, TO TEXTILE FINISHING MACHINERY CO., OF PROVIDENCE, RHODE ISLAND, A CORPORATION OF RHODE ISLAND

CYLINDER-TURNING DEVICE FOR USE PARTICULARLY IN CONTINUOUS-STEAMING MACHINES

Application filed November 21, 1929. Serial No. 408,911.

My invention relates to a device for turning cylinders through any desired arc. While my device is adapted to turn any type of cylinders such as logs, tubes, etc. through any desired arc it is particularly adapted for turning the continuous stream of looping bars fed from the delivery end of a continuous steaming machine through 90° so that they may be automatically fed on to the usual return coveyor leading to the front of the machine and deposited there for the operative to feed them in as usual. My invention therefore makes possible the returning of these looping bars automatically to the front of the machine thereby dispensing with an operative formerly thought necessary in the rear of the machine to take the bars as they come from the continuous stream and feed them individually on to the usual return conveyor. It is obvious, however, that the principles of my invention may be employed for automatically turning any type of cylinders in any type of industry.

These and such other objects of my invention as may hereinafter appear will be best understood from a description of a specific embodiment, such as is shown in the accompanying drawings, applied to a continuous steaming machine.

In the drawings, Fig. 1 is a side elevation of the rear end of a continuous steaming machine having my invention attached thereto.

Figure 1:
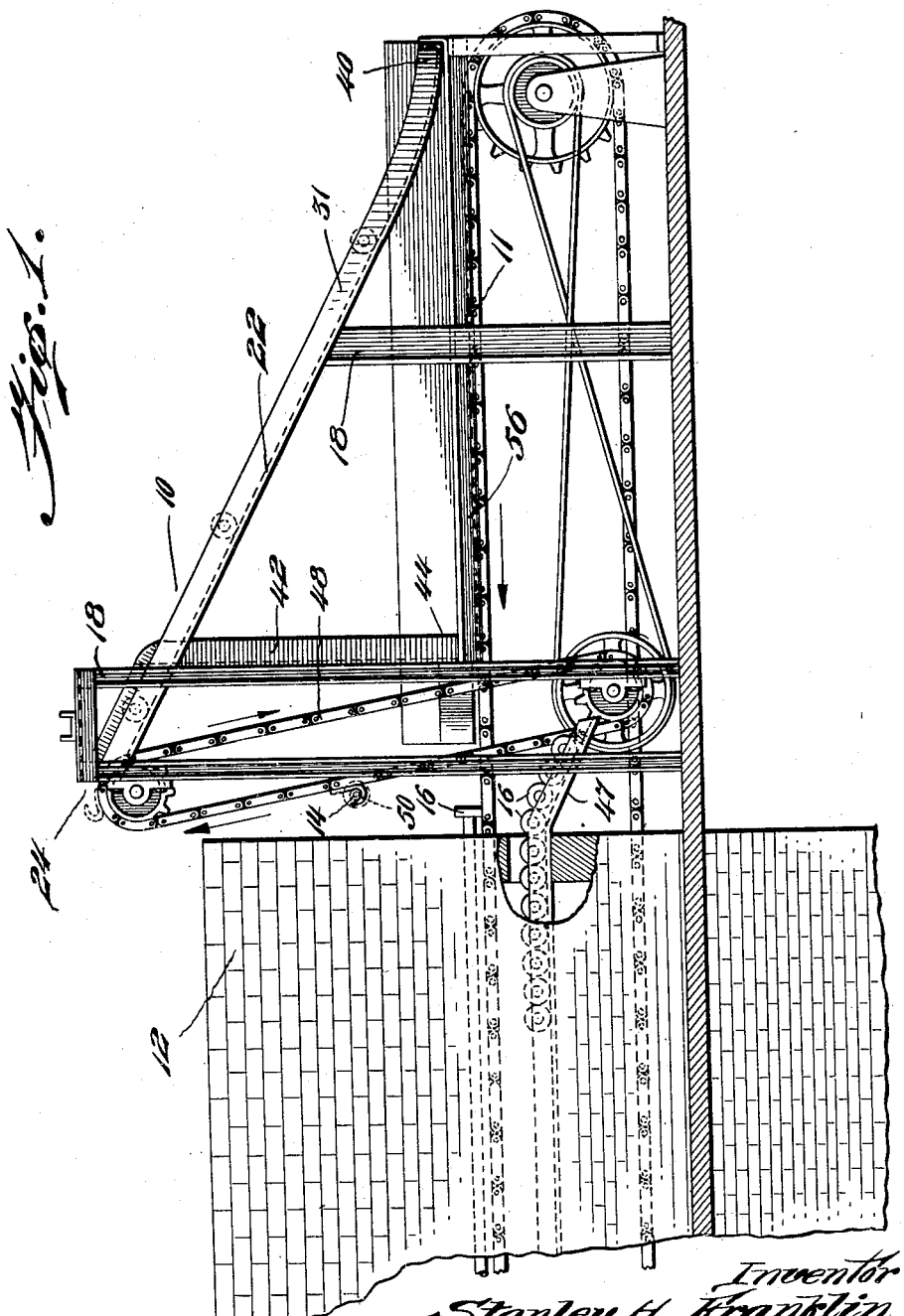
Figure 2:
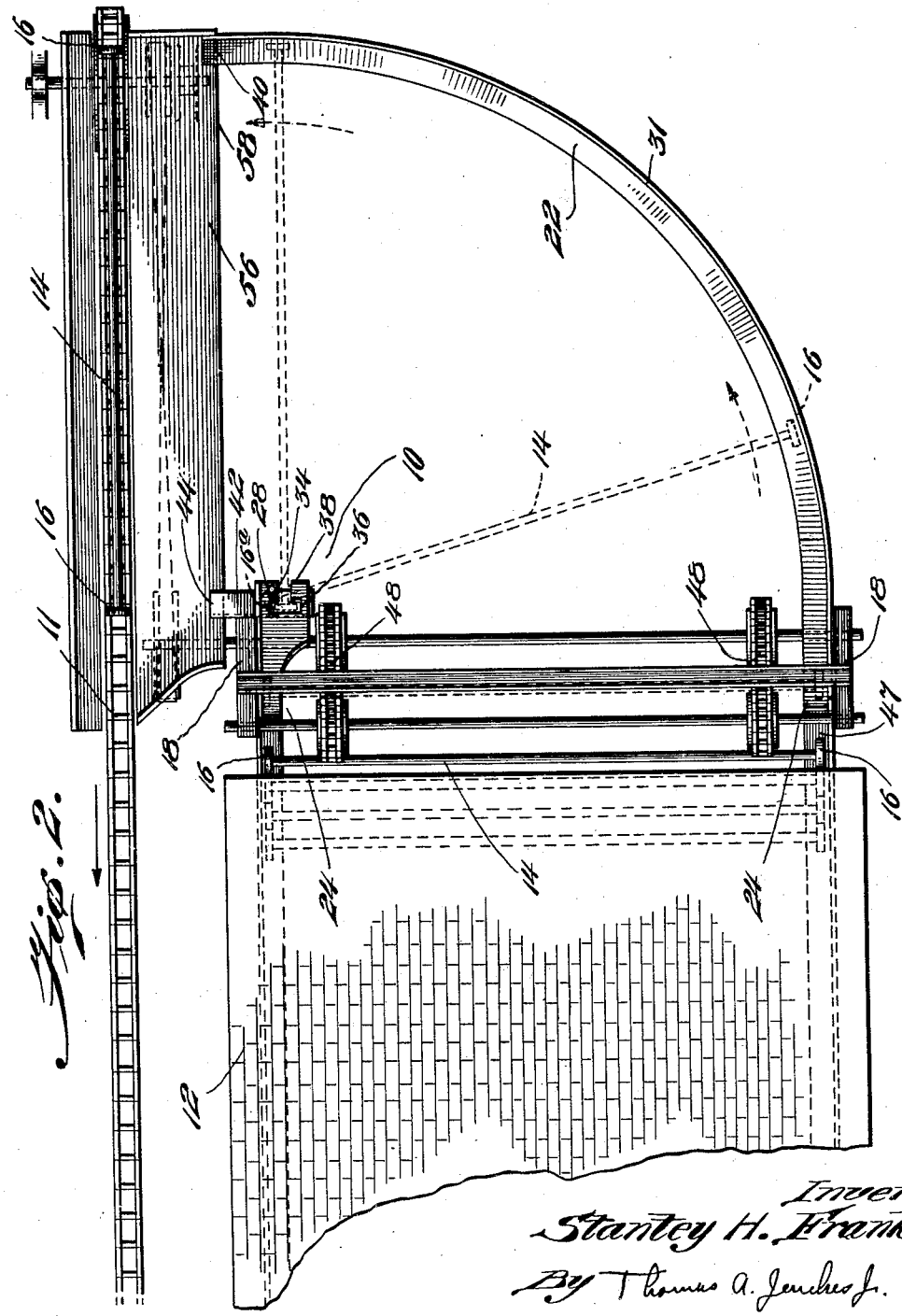
Fig. 2 is a plan view of the structure shown in Fig. 1.
Figure 3:
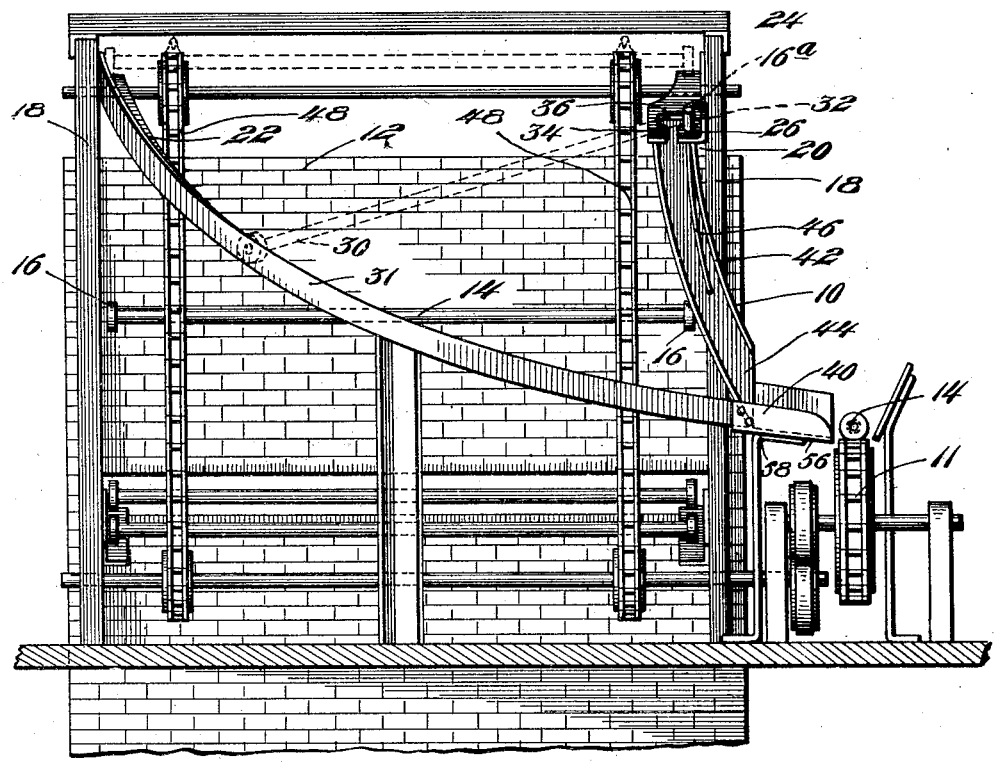
Fig. 3 is a rear elevation of the structure shown in Fig. 1.
Figure 4:
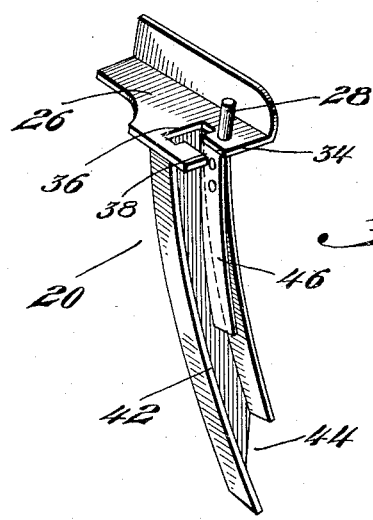
Fig. 4 is a detailed perspective view of the chute I preferably employ for dropping the pivoting end of the bar after it has been pivoted the desired amount.

In the drawings, wherein like characters of reference indicate like parts throughout, 10 generally indicates the turning device per se of my invention which may be constructed to turn a cylinder of any type such as a log, tube etc. any desired amount but which as shown is mounted at the rear delivery end of a continuous steaming machine 12 to individually turn the looping bars thereof substantially 90° and drop them on the usual return conveyor 11 leading to the front of the machine. The looping bars 14 employed in this type of machine are preferably provided with the hubs 16 on each end thereof and the specific embodiment of my device shown is particularly adapted for turning such a type of cylinder 14 comprising a bar, spool, or bobbin or any other type of device having a hub 16 at each end thereof although it is obvious that my device may be so modified to turn any type of a cylinder without having a hub on the end thereof. If desired the spaces between the trackways 20 and 22 may be filled in to form a warped turning table. The track-way 20 includes a relatively short plate 26 having a guide pin 28 projecting upwards therefrom and the other track-way 22 is spaced from said guide plate 20 substantially the length of a bar or cylinder 14 and is of a length and curvature corresponding to the desired number of degrees of turning of the bars in the embodiment shown adapted for continuous steaming machines of 90° and of an inclination sufficient to cause one end 30 of a bar to drop by gravity down said longer track-way while a hub 16ª of said opposite end 32 is retained and pivoted on said shorter plate 20 by said guide pin 28. Particularly where a cylinder 14 not having a hub 16 is employed and in the embodiment shown the longer track-way is provided with the retaining plate 31 on the outer edge thereof. The pivoting inclined track-way 20 includes means preferably a chute to drop the opposite pivoting end 32 substantially level and even with said free end 30 at the delivery end of said track-ways. This portion of the pivoting track-way 20 in the specific embodiment shown is constructed for the particular purpose of turning a bar 14 having a hub 16 on the pivoting end thereof and for this purpose the guide plate 20 is provided with a T-shaped slot 34 projecting outwards having a T-base 36 of substantially the size of a hub 16 and a T-head 38 of substantially the width of a bar terminating at the edge of the plate 26 substantially opposite the lower delivery end 40 of said longer pivoting track-way 22. I also provide a chute 42 leading downwards from said slot for dropping the opposite end 32 of said bar after it has passed through said slot 34 when said end has been turned the desired amount, in the specific embodiment shown substantially 90°, for dropping it substantially level and even with said free end 30 at the delivery end of said track-ways. In the embodiment shown said chute 42 is additionally slightly inclined or twisted, but it is obvious that the machine may be so constructed that this need not be necessary. In order to retard the drop of the opposite end 32 of a bar 14 I preferably provide the spring 46 projecting from the inner wall of said chute 42 so that said ends 30 and 32 may be substantially level when leaving the delivery end of said guide-ways. It is obvious, however, that the pivoting track-way 20 may be constructed in different fashions such as a semi-spiral guide-way if desired particularly where cylinders 14 not having hubs on the ends thereof are desired to be turned.

Where a continuous steaming machine is employed as in the embodiment shown it is obvious that the looping bars 14 are fed down the usual chute 47 at the rear or delivery end thereof as the cloth normally looped around them in use has been taken from them. It is thus obvious that a means 48 should be provided to individually take said bars 14 from the continuous stream at the delivery end of said machine and feed them at spaced intervals on the receiving end 24 of said track-ways. While any type of means may be employed I have shown in the drawings a continuous substantially vertical conveyor 48 abutting said bars as they fall down the chute 47 having the hooks 50 thereon adapted to grasp individual bars 14 from said continuous stream and drop them at spaced intervals on the receiving end 24 of said inclined track-ways. In the embodiment shown the return conveyor 11 having suitable means or hooks projecting upwards therefrom is provided running from the delivery ends of said longer track-way and chute and substantially parallel thereto and running to the front end of said steaming machine 12. When my improved turning device is used for this purpose or if desired for other purposes an inclined apron 56 is provided having an upper end 58 under the delivery ends 40 and 44 of said larger trackway 22 and chute 42 for receiving substantially simultaneously both ends of a bar 14 and delivering it over said apron 51 on the return conveyor 11.

For purposes of more clearly understanding the operation of the machine, I have shown cylinders or bars 14 in various positions spaced more closely together than in actual practice. The operation of my improved device is obvious from the above description. The continuous stream of bars is fed down the chute 46 at the delivery end of the continuous steaming machine 12. The hooks 50 on the conveyor 48 then grasp the center portions of an individual bar 14 raise it up and drop it on the delivery end 24 of the turning table 10. The bar then starts to roll down the inclined plate 20 and the curved track-way 22 until it abuts the guide pin 28, the inner end 32 of said bar abutting the guide pin and the hub 16ª then embracing said guide pin; thus, while the free end 30 of said bar is freely dropping by gravity down the longer inclined track-way 22 the opposite end is firmly held by said guide pin 28 and pivoted on the top of said plate 20 until it falls through the slot 34 down the chute 42, is braked in its falling action by the spring 46 and arrives at the delivery ends 40 and 44 of said track-ways substantially simultaneously with the free end 30 so that both ends are substantially delivered at once on to the inclined apron 56. The bars 14 are then individually dropped on to the return conveyor 11 and are returned in the usual manner to the front of the machine.

It is thus obvious that I have provided a novel method and means of turning any type of cylinder through any desired arc particularly adapted for use in turning the looping bars of continuous steaming machines from the delivery to the receiving ends thereof, in combination with an automatic feeding conveyor for automatically feeding the bars on the turning table 10 and a return conveyor 11 for returning said bars to the rear end of the machine. It is also obvious that the device with slight modifications is applicable for turning any type of cylinder with or without a spool or hub on the end thereof through any desired number of degrees.

It is understood that my invention is not limited to the specific embodiments shown and that various deviations may be made therefrom without departing from the spirit and scope of the appended claims.

What I claim is:

1. A device for returning the continuous stream of looping bars fed from the delivery end of a continuous steaming machine to the receiving end thereof, each having a hub on each end thereof comprising, in combination, inclined track-ways shaped to guide the bars as they drop by gravity contacting the upper surfaces thereof and turn them through the desired arc spaced from each other substantially the width of a bar having substantially relatively level upper ends, one track-way being relatively longer than the other and of a length and shape to swing the free end of a bar through the desired arc and the other being relatively short and of a shape to retain the bar hub of said opposite end pivot and drop it substantially level and even with said free end at the delivery end of said track-ways, means to take bars from the continuous stream at the delivery end of said machine and feed them at spaced intervals on the receiving end of said track-ways and means to receive said bars from the delivery end of said track-ways and deliver them at the receiving end of said machine.

2. A device for returning the continuous streams of looping bars fed from the delivery end of a continuous steaming machine to the receiving end thereof, comprising in combination, inclined track-ways shaped to guide the bars as they drop by gravity contacting the upper surfaces thereof and turn them through the desired arc spaced from each other substantially the width of a bar having substantially relatively level upper ends, one track-way being relatively longer than the other and of a length and shape to swing the free end of a bar through the desired arc and the other being relatively short and of a shape to pivot the opposite end and drop it substantially level and even with said free end at the delivery end of said track-ways, said track-ways being so shaped as to retain said bars therein at an angle during the pivoting thereof, means to take bars from the continuous stream at the delivery end of said machine and feed them at spaced intervals on the receiving end of said track-ways and means to receive said bars from the delivery end of said track-ways and deliver them at the receiving end of said machine.

3. A device for turning a continuous stream of cylinders, each having a hub on each end thereof comprising in combination, inclined track-ways shaped to guide the cylinders as they drop by gravity contacting the upper surfaces thereof and thus turn them through the desired arc spaced from each other substantially the width of a cylinder having substantially relatively level upper ends, one track-way being relatively longer than the other and of a length and shape to swing the free end of a cylinder through the desired arc and the other being relatively short and of a shape to retain the hub of said opposite end pivot and drop it substantially level and even with said free end at the delivery end of said track-ways and means to feed said cylinders at spaced intervals at the delivery end of said track-ways.

4. A device for turning a continuous stream of cylinders comprising in combination, inclined track-ways shaped to guide the cylinders as they drop by gravity contacting the upper surfaces thereof and thus turn them through the desired arc spaced from each other substantially the width of a cylinder having substantially relatively level upper ends, one track-way being relatively longer than the other and of a length and shape to swing the free end of a cylinder through the desired arc and the other being relatively short and of a shape to pivot the opposite end and drop it substantially level and even with said free end at the delivery end of said track-ways, said track-ways being so shaped as to retain said cylinders therein at an angle during the pivoting thereof and means to feed said cylinders at the delivery end of said track-ways.

5. A device for turning a continuous stream of cylinders, comprising, in combination, inclined track-ways shaped to guide the cylinders as they drop by gravity contacting the upper surfaces thereof and thus turn them through the desired arc spaced from each other substantially the width of a cylinder having substantially relatively level upper ends, one track-way being relatively longer than the other and of a length and shape to swing the free end of a cylinder through the desired arc and the other being relatively short and of a shape to pivot the opposite end and drop it substantially level and even with said free end at the delivery end of said track-ways, said track-ways being so shaped as to retain said cylinders therein at an angle during the pivoting thereof.

6. A device for turning a continuous stream of cylinders, comprising an inclined table of substantially the width of said cylinders having a substantially level upper end, one edge of said table being relatively longer than the other and of a length and shape to permit an end of a cylinder to drop by gravity and swing through the desired arc and the other edge being relatively short and of a shape to pivot the opposite end and drop from said table substantially level and even with said free end, said pivoting edge having a projection thereon to cause pivoting of said cylinders and said table being so shaped as to retain said cylinders thereon during the pivoting thereof.

7. A device for turning a continuous stream of cylinders, comprising an inclined table shaped to guide the cylinders as they drop by gravity contacting the upper surface thereof and turn them through the desired arc of substantially the width of said cylinders having a substantially level upper end, one edge of said table being relatively longer than the other and of a length and shape to permit an end of a cylinder to drop by gravity and swing through the desired arc and the other edge being relatively short and of a shape to pivot the opposite end and drop from said table substantially level and even with said free end, said table being so shaped as to retain said cylinders thereon during the pivoting thereof.

8. A device for returning the relatively continuous stream of looping bars of a continuous steaming machine, each having a hub on each end thereof comprising in combination, a frame having inclined track-ways mounted on the receiving end thereof, one including a relatively short plate and having a guide pin projecting upwards therefrom and the other being spaced from said first trackway substantially the length of a bar of a length and curvature of substantially 90° and of an inclination sufficient to cause one end of the bar to drop by gravity down said longer track-way while the hub of said opposite end is retained and pivoted on said shorter track-way by said guide pin, a retaining plate on the outer edge of said longer track-way, a T-shaped slot on the plate of said shorter track-way having a T-head of substantially the size of a hub and a T-arm substantially the width of a bar terminating at the edge of said plate substantially opposite the lower delivery end of said longer track-way, a chute leading downwards from said slot for dropping the opposite end of said bar after it has passed through said slot when said first end has been turned substantially 90°, a spring projecting from the inner wall of said chute for retarding the fall of said opposite end, a conveyor near the delivery ends of said longer guide-way and chute and substantially parallel thereto, an inclined apron having a substantially level upper end under the delivery end of said longer track-way and chute for receiving substantially simultaneously both ends of a bar and delivering it on to the conveyor and a continuous feeding conveyor having hooks thereon adapted to grasp individual bars from said continuous stream and drop them at spaced intervals on the receiving end of said inclined track-ways.

9. A device for returning the relatively continuous stream of looping bars of a continuous steaming machine each having a hub on each end thereof comprising in combination, a frame having inclined track-ways mounted on the receiving end thereof, one including a relatively short plate and having a guide pin projecting upwards therefrom and the other being spaced from said first track-way substantially the length of a bar, of a length and curvature of 90° and of an inclination sufficient to cause one end of the bar to drop by gravity down said longer track-way while the hub of said opposite end is retained and pivoted on said shorter track-way by said guide pin, a T-shaped slot on the plate of said shorter track-way having a T-head of substantially the size of a hub and a T-arm substantially the width of a bar terminating at the edge of said plate substantially opposite the lower delivery end of said longer track-way, a chute leading downwards from said slot for dropping the opposite end of said bar after it has passed through said slot when said first end has been turned substantially 90°, a conveyor near the delivery ends of said longer guide-way and chute and substantially parallel thereto, an inclined apron having a substantially level upper end under the delivery end of said longer guide-way and chute for receiving substantially simultaneously both ends of a bar and delivering it on to the conveyor and a continuous feeding conveyor having hooks thereon adapted to grasp individual bars from said continuous stream and drop them at spaced intervals on the receiving end of said inclined track-ways.

10. A device for returning the relatively continuous stream of looping bars of a continuous steaming machine, comprising in combination, a frame having inclined track-ways mounted on the receiving end thereof, one including a relatively short plate and having a guide pin projecting upwards therefrom and the other being spaced from said first track-way substantially the length of a bar of a length and curvature of 90° and of an inclination sufficient to cause one end of the bar to drop by gravity down said longer track-way while said opposite end is retained and pivoted on said shorter track-way by said guide pin, a retaining plate on the outer edge of said longer track-way, a chute leading downwards from said plate of said short track-way substantially opposite the delivery end of said longer track-way for dropping the opposite end of said bar when said first end has been turned substantially 90°, a spring projecting from the inner wall of said chute for retarding the fall of said opposite end, a conveyor near the delivery ends of said longer track-way and chute and substantially parallel thereto, an inclined apron having a substantially level upper end under the delivery end of said longer track-way and chute for receiving substantially simultaneously both ends of a bar and delivering it on to the conveyor and a continuous feeding conveyor having hooks thereon adapted to grasp individual bars from said continuous stream and drop them at spaced intervals on the receiving end of said inclined track-ways.

11. A device for turning a relatively continuous stream of cylinders each having a hub on each end thereof, comprising in combination, a frame having inclined track-ways mounted on the receiving end thereof, one including a relatively short plate and having a guide pin projecting upwards therefrom and the other being spaced from said first track-way substantially the length of a cylinder, of a length and curvature corresponding to the desired number of degrees of turning of said cylinders and of an inclination sufficient to cause one end of the cylinder to drop by gravity down said longer track-way while the hub of said opposite end is retained and pivoted on said shorter track-way by said guide pin, a retaining plate on the outer edge of said longer track-way, a T-shaped slot on the plate of said shorter track-way having a T-head of substantially the size of a hub and a T-arm substantially the width of a cylinder terminating at the edge of said plate substantially opposite the lower delivery end of said longer track-way, a chute leading downwards from said slot for dropping the opposite end of said cylinder after it has passed through said slot when said first end has been turned the desired amount, a spring projecting from the inner wall of said chute for retarding the fall of said opposite end and a continuous feeding conveyor having hooks thereon adapted to grasp individual cylinders from said continuous stream and drop them at spaced intervals on the receiving end of said inclined track-ways.

12. A device for turning a relatively continuous stream of cylinders, comprising in combination, a frame having inclined track-ways mounted on the receiving end thereof, one including a relatively short plate and having a guide pin projecting upwards therefrom and the other being spaced from said first track-way substantially the length of a cylinder, of a length and curvature corresponding to the desired number of degrees of turning of said cylinders and of an inclination sufficient to cause one end of a cylinder to drop by gravity down said longer track-way while said opposite end is retained and pivoted on said shorter track-way by said guide pin, a retaining plate on the outer edge of said longer track-way, a chute leading downwards from said plate of said short track-way substantially opposite the lower end of said longer track-way for dropping the opposite end of said bar when said first end has dropped the desired amount and a continuous feeding conveyor having hooks thereon adapted to grasp individual cylinders from said continuous stream and drop them at spaced intervals on the receiving end of said inclined track-ways.

13. A device for turning a relatively continuous stream of cylinders, comprising in combination, a frame having inclined track-ways mounted on the receiving end thereof, one including a relatively short plate and having a guide pin projecting upwards therefrom and the other being spaced from said first track-way substantially the length of a cylinder, of a length and curvature corresponding to the desired number of degrees of turning of said cylinders and of an inclination sufficient to cause one end of a cylinder to drop by gravity down said longer track-way while said opposite end is retained and pivoted on said shorter track-way by said guide pin and a chute leading downwards from said plate of said short trackway substantially opposite the lower end of said longer track-way for dropping the opposite end of said bar when said first end has dropped the desired amount.

In testimony whereof I affix my signature.

STANLEY H. FRANKLIN.